(12) United States Patent
Vargas et al.

(10) Patent No.: US 7,552,855 B2
(45) Date of Patent: Jun. 30, 2009

(54) HOLE REPAIR TECHNIQUE AND APPARATUS

(75) Inventors: Chris Vargas, Hamden, CT (US); John F. Mullooly, Stafford Springs, CT (US); Allen Wayne Brown, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 460 days.

(21) Appl. No.: 11/249,668

(22) Filed: Oct. 13, 2005

(65) Prior Publication Data

US 2007/0084906 A1   Apr. 19, 2007

(51) Int. Cl.
*B23P 6/00* (2006.01)
(52) U.S. Cl. .............. 228/119; 29/402.07; 29/889.1
(58) Field of Classification Search .............. 228/119; 219/76.14; 29/889.1, 402.07; 164/92.1; 156/98
See application file for complete search history.

(56) References Cited

U.S. PATENT DOCUMENTS

| | | | |
|---|---|---|---|
| 2,120,525 A | | 6/1938 | McKerihan |
| 3,445,914 A | * | 5/1969 | Altgelt .................. 228/119 |
| 3,576,065 A | * | 4/1971 | Frazier .................. 29/402.18 |
| 3,740,820 A | | 6/1973 | Tarves, Jr. |
| 4,285,459 A | * | 8/1981 | Baladjanian et al. ........ 228/119 |
| 4,953,777 A | * | 9/1990 | Griffith et al. ............ 228/119 |
| 5,111,570 A | | 5/1992 | Baumgarten et al. |
| 5,606,797 A | | 3/1997 | Reynolds |
| 6,281,467 B1 | | 8/2001 | Gould et al. |
| 6,413,650 B1 | * | 7/2002 | Dupree et al. ............. 428/579 |
| 6,545,244 B1 | | 4/2003 | Gould et al. |
| 6,565,680 B1 | * | 5/2003 | Jackson et al. ............ 148/428 |
| 6,742,698 B2 | | 6/2004 | Shah et al. |
| 2005/0015980 A1 | * | 1/2005 | Kottilingam et al. ... 29/888.011 |
| 2005/0061858 A1 | | 3/2005 | Ditzel et al. |
| 2005/0173493 A1 | * | 8/2005 | Workman et al. .......... 228/101 |
| 2006/0191119 A1 | * | 8/2006 | Coleman et al. ......... 29/402.01 |
| 2006/0248719 A1 | * | 11/2006 | Szela et al. ............... 29/889.7 |

FOREIGN PATENT DOCUMENTS

EP   1 147 849 A1   10/2001

OTHER PUBLICATIONS

Workman, David, et al., Evaluation of Resistance Welding Hole Repair Technique for Aerospace Alloys, Jun. 2004, pp. 1-4.
EWI Insights, Materials Joining Newsletter, Evaluation of Resistance Welding Hole Repair Technique of Aerospace Alloys, vol. 18, No. 1, Winter, 2005.

* cited by examiner

*Primary Examiner*—Jessica L Ward
*Assistant Examiner*—Devang Patel
(74) *Attorney, Agent, or Firm*—Kinney & Lange, P.A.

(57) ABSTRACT

A method of hole defect repair includes removing one or more defects at or near a desired hole shape in a substrate by removing a non-concentric portion of the substrate proximate the desired hole shape, and welding a filler material to the substrate after removing the non-concentric portion of the substrate.

11 Claims, 6 Drawing Sheets

HOLE REPAIR TECHNIQUE AND APPARATUS

BACKGROUND OF THE INVENTION

The present invention relates to methods of repairing substrates, and more particularly to methods of repairing damaged substrates having holes disposed therethrough.

It is possible to repair worn, corroded, or otherwise damaged holes in metallic substrates. However, known repair techniques cause excessive removal of parent substrate material. For instance, in order to repair a crack that has formed at a perimeter of a rivet hole in a flange made of 6061 aluminum (Al), the hole is remachined to a larger diameter to remove the crack. In other words, a circular hole would be remachined co-axially with the centerline axis of the existing (and damaged) rivet hole and to a diameter larger than the desired (i.e., blueprint) rivet hole diameter. A bushing is then press-fit or adhesively bonded to the flange inside the remachined hole to produce a repaired hole at the desired blueprint specifications, for parameters such as size and shape. However, this type of repair is not a structural repair, and the load-carrying capabilities of the repaired structure are less than ideal. Also, because of the parent flange material removal, there is a finite number of times the repair can be performed. Therefore, there is a need for improved methods of repairing damaged holes in metallic substrates.

BRIEF SUMMARY OF THE INVENTION

The present invention provides an alternative method for repairing damage to a substrate with a hole. Hole defect repair according to the present invention includes removing one or more defects at or near a desired hole shape in a substrate by removing a non-concentric portion of the substrate proximate the desired hole shape, and welding a filler material to the substrate after removing the non-concentric portion of the substrate. In some embodiments, post-weld finishing may be necessary to obtain the final desired hole shape in the substrate.

DETAILED DESCRIPTION

Metal parts having bolt holes, rivet holes, and other similar holes and openings can become worn, corroded, or otherwise oversized or damaged. Damage at or near such holes can include circumferential damage, cracks, corrosion, pitting, elongation, etc. due to localized wear. Such damage can be repaired to return the part, and more specifically the hole formed in the part, back to desired specifications (i.e., returning the hole to blueprint specifications). According to the present invention, the damage can be removed by first conducting localized machining (or other suitable material removal processes) and then welding the part with additional material to provide a hole with desired characteristics (e.g., size, shape and location). In some situations, additional finishing steps, such as additional machining, may be conducted to complete the repair process.

Figure 1A:
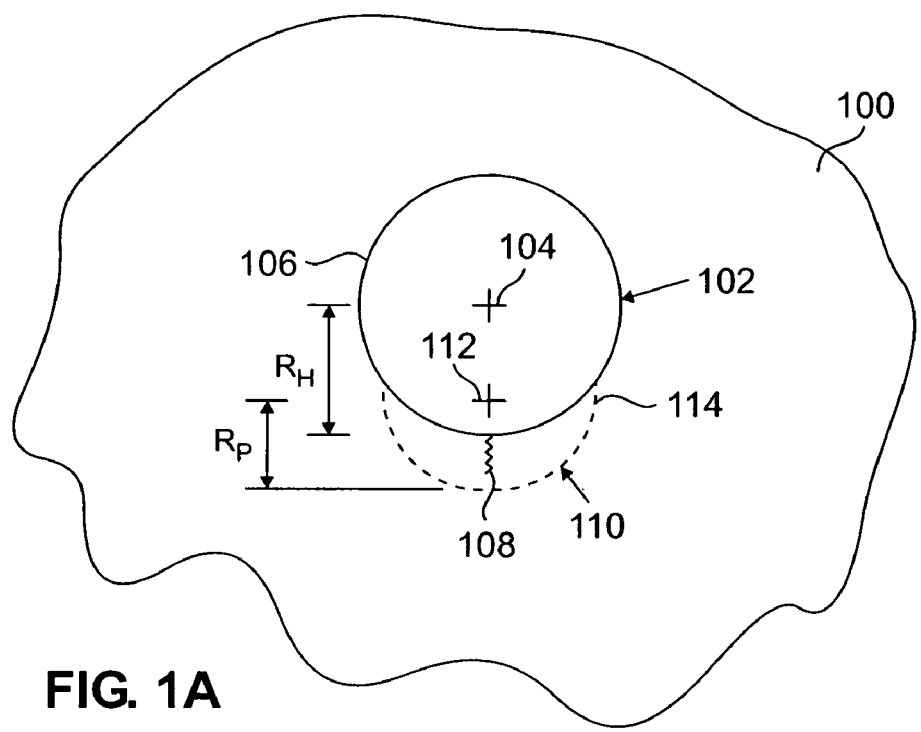
FIG. 1A is a schematic representation of a repair pattern for a hole in a substrate with a crack.

In order to repair a damaged substrate, the damage is first identified. Known nondestructive inspection (NDI) techniques, such as visual, flourescent penetrant inspection (FPI), eddy current, ultrasonic and x-ray techniques, etc. can be used. Once the damage has been identified, an appropriate repair procedure can be selected. "Discrete damage", as referred to herein, means damage to a substrate at or near a hole where the hole is otherwise substantially dimensionally acceptable. Discrete damage, such as one or more localized cracks located at or near a perimeter of a hole in a substrate, can be repaired as follows. FIG. 1A is a schematic representation of substrate 100 with substantially circular hole 102 therethrough, which is defined by hole centerline axis 104 and hole perimeter 106 at radius $R_H$ about axis 104. Crack 108 in substrate 100 extends from perimeter 106 of hole 102. Moon-shaped pattern 110 is established around crack 108. An outer edge of pattern 110 is defined by pattern centerline axis 112 and pattern perimeter 114 at a radius $R_P$ about axis 112. Pattern centerline axis 112 is spaced from hole centerline axis 104, and is located within hole perimeter 106. An inner edge of pattern 110 is defined by a portion of hole perimeter 106. Crack 108 is located entirely within pattern 110. Radius $R_P$ is smaller than radius $R_H$, although such a relationship is not required and radius $R_P$ will vary depending on the size and location of crack 108.

Material of substrate 100 is removed within pattern 110, which removes all of the material of substrate 100 containing crack 108. Material can be removed by machining (e.g., using a reamer, drill bit, or other tooling), or any other suitable material removal processes. In practice, pattern 110 can be defined in reference to desired tooling for removing material of substrate 100, for instance, a desired drill bit. It is generally desired that removal of material of substrate 100 (i.e., the parent material) be reduced. In other words, it is desired to leave as much of substrate 100 intact as is possible, while still removing crack 108 in its entirety. This can be accomplished through selection of parameters such as the location of pattern centerline axis 112 and the length of radius $R_P$.

Once material of substrate 100 is removed within pattern 110, weld material 124 is welded to substrate 100 to fill at least a portion 126 of pattern 110. The weld material fills at least a part of the pattern 110 where material of substrate 100 was removed to at least approximately define hole 102 with desired specifications. With certain substrates for aerospace applications, such as 6061 aluminum (Al), Inconel® 718 (a high strength austenitic nickel-chromium-iron alloy) and titanium (Ti) 6-4, conductive heat resistance welding can be used. Examples of conductive heat resistance welding processes are found in U.S. Pat. Nos. 6,545,244 and 6,281,467. In some situations, other welding processes can also be used such as gas tungsten arc welding (GTAW) and resistance welding. Weld material 124 is a weldable material selected according to the desired application, and can be the same material as substrate 100 or another material. For example, suitable combinations of substrate (i.e., the parent material) and weld material (i.e., the filler) are: Inconel® 718 (substrate) and Inconel® 718 (filler); Ti-6Al-4V (substrate) and commercially pure Ti (filler) or Ti-6Al-4V (filler); Al 6061 (substrate) and Al 4043 (filler) or Al 6061 (filler); Thermospan® (a low-expansion, precipitation hardenable iron-based alloy available from Carpenter Technology Corp., Wyomissing, Pa.) (substrate) and Inconel® 625 (filler) or Thermospan® (filler); and Waspaloy (a nickel-base, precipitation hardenable alloy) (substrate) and Waspaloy (filler). In addition, the weldable filler materials disclosed in U.S. Pat. No. 6,742,698 and U.S. Pat. App. Pub. No. 2005/0061858 may be suitable weld materials 124 for some applications.

Figure 1B:
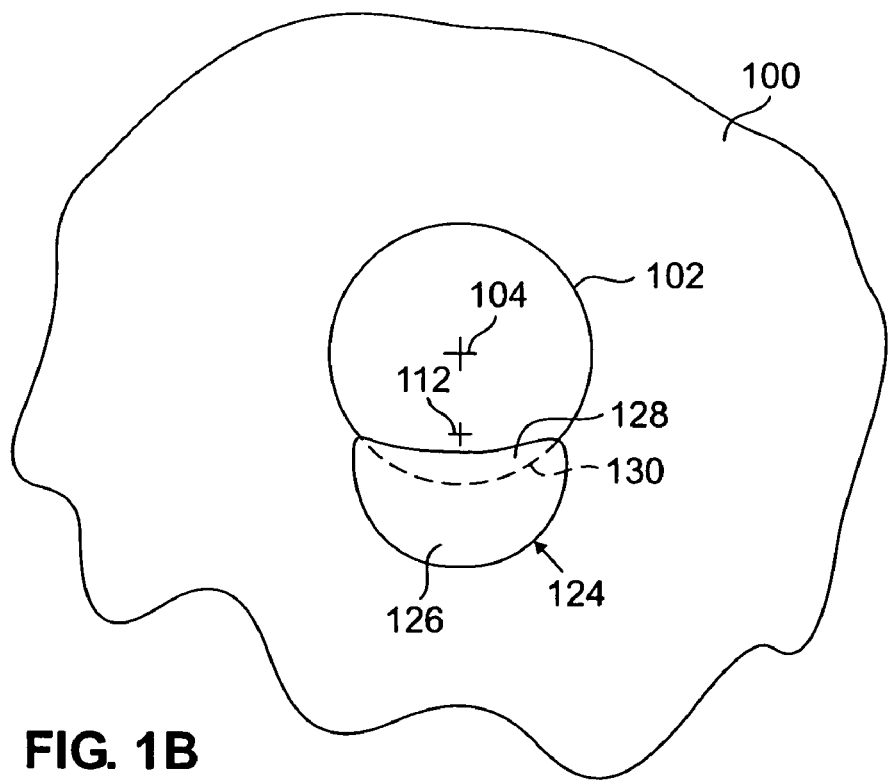
FIG. 1B is a schematic representation of the substrate of FIG. 1A after a filler material has been welded to the substrate.
Figure 1C:
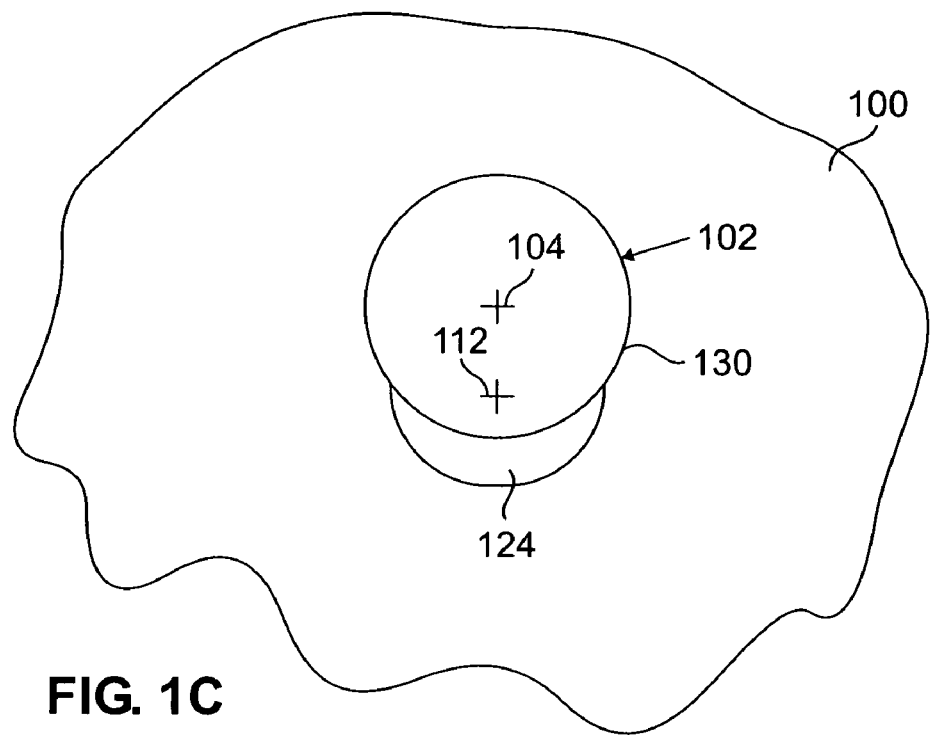
FIG. 1C is a schematic representation of the substrate of FIGS. 1A-1B after finishing processes.

In some situations, weld material 124 (i.e., the filler) will not be formed to final specifications and tolerances immediately following the welding process, such as shown in FIG. 1B. In such situations, additional finishing steps can be conducted. For instance, excess weld material 128 may be present within a perimeter of a desired hole location 130. Excess weld material 128 can be removed by machining (e.g., using a reamer, drill bit, or other tooling), or other material removal processes. After finishing, hole 102 substantially matches desired hole location 130, as shown in FIG. 1C.

Figure 2:
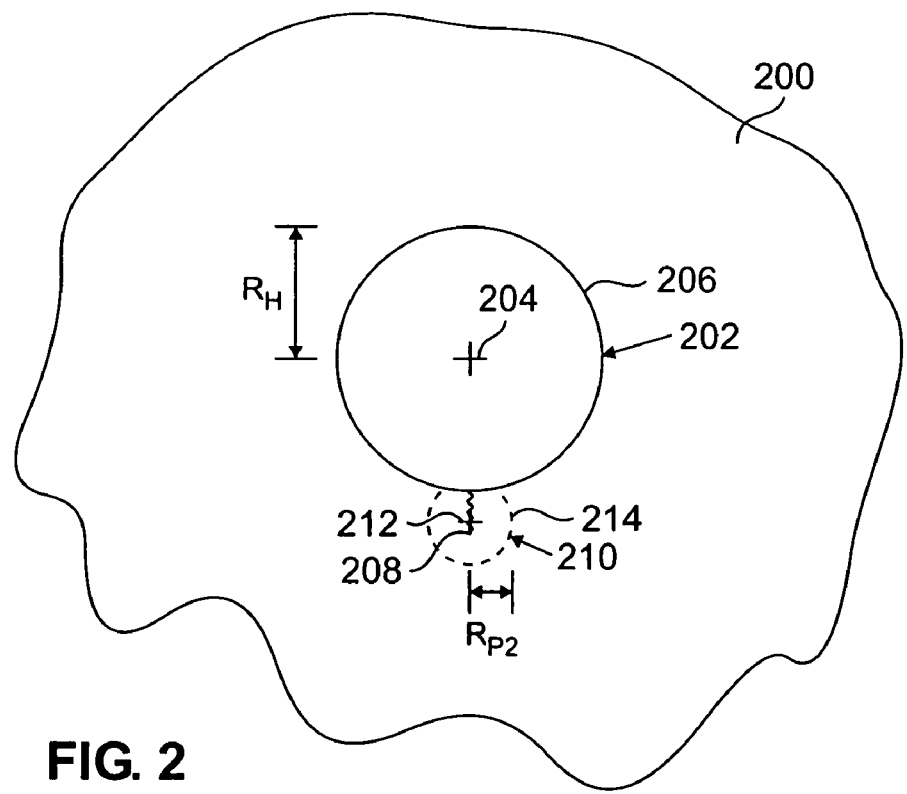
FIG. 2 is a schematic representation of another repair pattern for a hole in a substrate with a crack.
Figure 3:
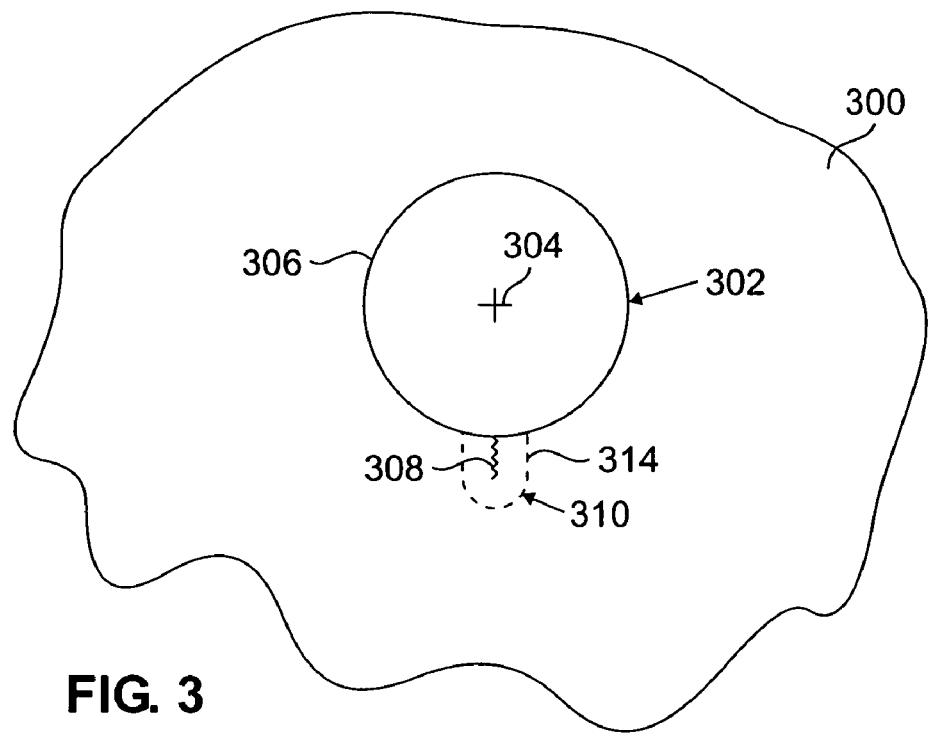
FIG. 3 is a schematic representation of a parabolic repair pattern for a hole in a substrate with a crack.

It is possible to utilize other patterns for removing and welding material in order to repair a hole in a substrate. FIG. 2 is a schematic representation of another repair pattern 210 for hole 202 (having centerline axis 204 and radius $R_H$) in substrate 200 with crack 208. Pattern 210 is generally moon-shaped, and has an outer edge defined by pattern centerline axis 212 and perimeter 214 at radius $R_{P2}$ about axis 212. Axis 212 is located outside hole perimeter 206. FIG. 3 is a schematic representation of U-shaped or parabolic pattern 310 for hole 302 (having centerline axis 304) in substrate 300 with crack 308. Pattern 310 has perimeter 314, which extends between two spaced points along perimeter 306 of hole 302. The procedure described above with respect to FIG. 1A through 1B can be conducted using patterns 210 and 310 as shown and described with respect to FIGS. 2 and 3, respectively.

Figure 4A:
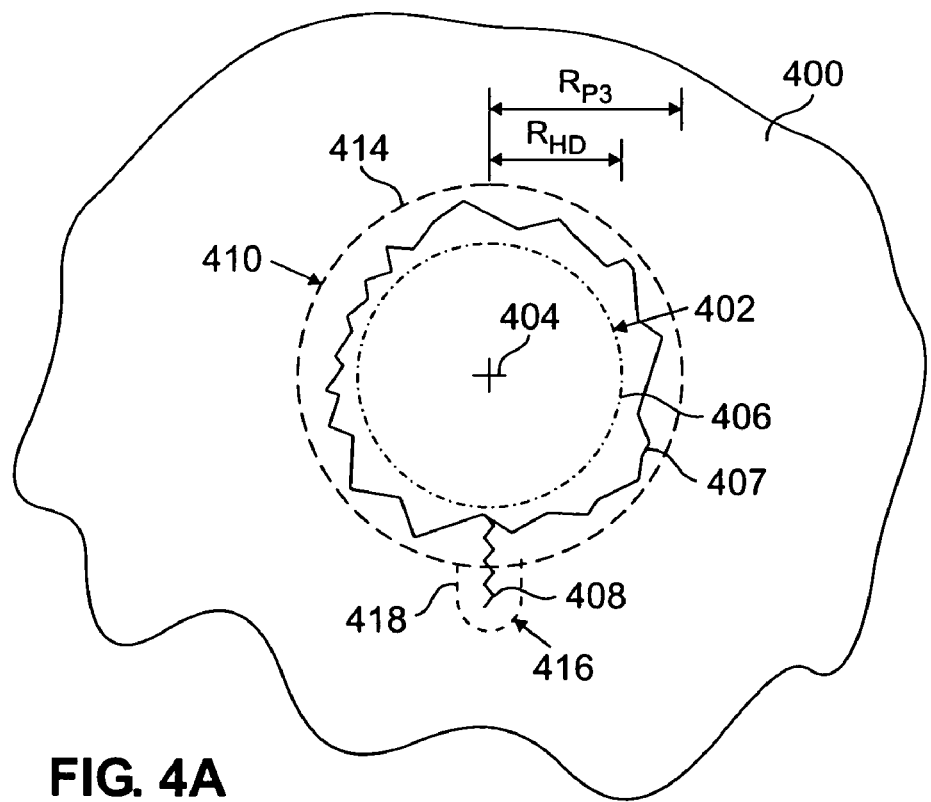
FIG. 4A is a schematic representation of a complex repair pattern for a hole in a substrate with circumferential damage and a crack.

In some situations, a metal part may have multiple types of damage. For instance, a part may have non-discrete damage (e.g., corrosion damage over a significant area) as well as discrete damage (e.g., multiple localized cracks) near a hole. A metallic part with multiple types of damage can be repaired according to the present invention using a complex repair pattern made up of a plurality of repair patterns or repair pattern regions. FIG. 4A is a schematic representation of substrate 400 with desired hole location 402 indicated thereon, which is defined by hole centerline axis 404 and hole perimeter 406 at radius $R_{HD}$ about axis 404. Corroded hole perimeter 407 is located near desired hole location 402. As shown in FIG. 4A, a hole originally formed at desired hole location 402 has circumferential corrosion, which has enlarged the original hole slightly and produced an irregular shaped hole defined by corroded hole perimeter 407. Crack 408 in substrate 400 extends from corroded hole perimeter 407.

A first, substantially circular pattern 410 is defined by first pattern perimeter 414 at radius $R_{P3}$ about hole centerline axis 404. First pattern 410 is coaxial with desired hole location 402. Radius $R_{P3}$ is larger than radius $R_{HD}$, such that first pattern 410 encompasses all of corroded hole perimeter 407. A second, U-shaped or parabolic pattern 416 is defined by second pattern perimeter 418. Second pattern 416 is located around a portion of crack 408 at first pattern perimeter 414, such that all of crack 408 is located within first pattern 410 and second pattern 416.

Material of substrate 400 is removed within first pattern 410, which removes material of substrate 400 in which corroded perimeter 407 is defined. Material of substrate 400 is also removed within second pattern 416, which removes material of substrate 400 containing a portion of crack 408 (i.e., the portion of crack 408 not contained in first pattern 410). Material may be removed within first pattern 410 and then from within second pattern 416. Material can be removed by machining (e.g., using a reamer, drill bit, or other tooling), or other material removal processes. In further embodiments, additional patterns can be defined on substrate 400. The particular number, shape, and arrangement of material removal patterns will vary depending on the particular types of damage to substrate 400.

Figure 4B:
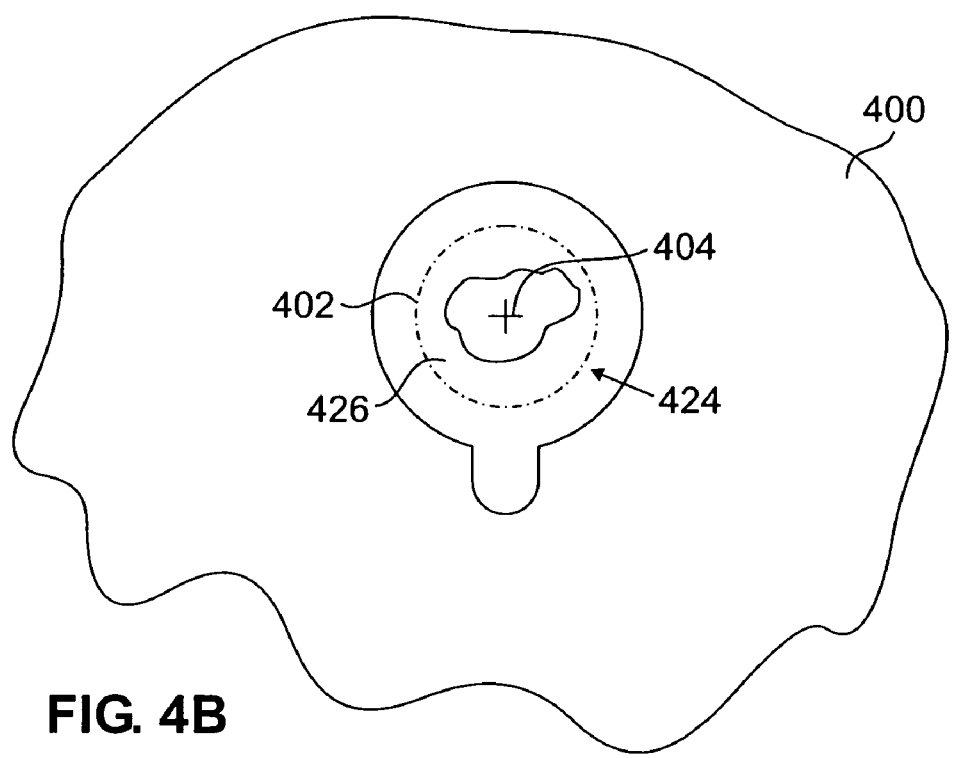
FIG. 4B is a schematic representation of the substrate of FIG. 4A after a filler material has been welded to the substrate.

Once material has been removed from within first pattern 410 and second pattern 416, weld material 424 (i.e., the filler) material is welded within at least a portion 426 of first pattern 410 and within all of second pattern 416, as shown in FIG. 4B. This welding process can be generally similar to that described above with respect to FIG. 1A-1C. The weld material 424 is generally welded within first pattern 410 and second pattern 416 at the same time. However, it is possible to weld filler 424 within second pattern 416 and then separately weld filler 424 within first pattern 410. Machining can be performed between such separate welding steps. Moreover, different welding techniques can be used. For instance, second pattern 416 can be welded using GTAW techniques and first pattern 410 can be welded using conductive heat resistance welding techniques, etc.

Figure 4C:
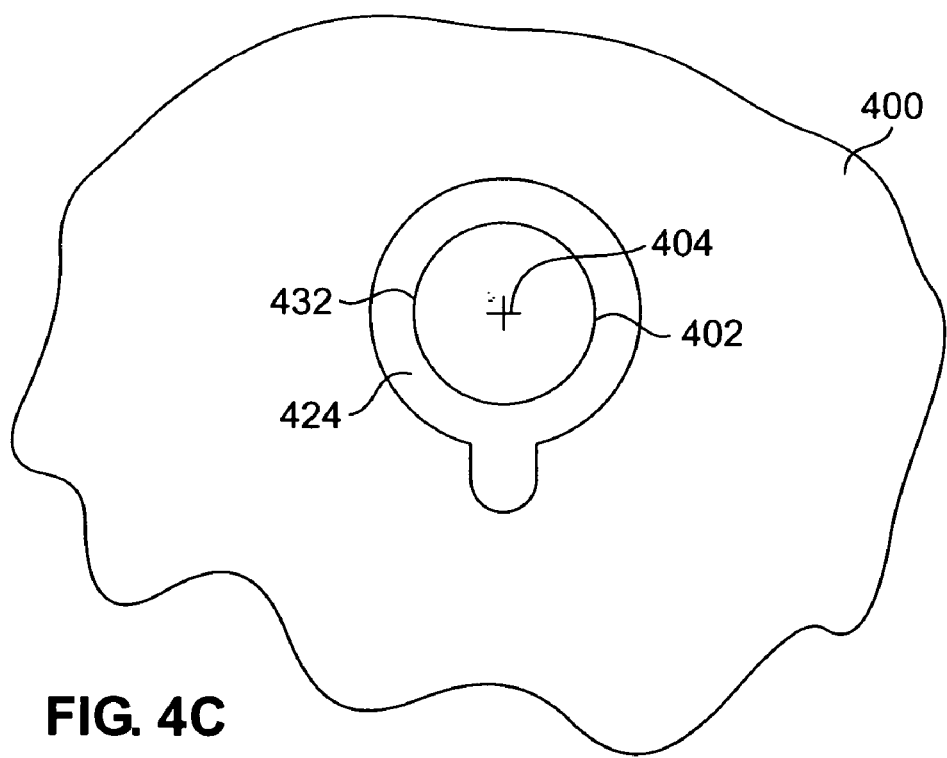
FIG. 4C is a schematic representation of the substrate of FIGS. 4A-4B after finishing processes.

After filler 424 has been welded within at least portion 426 of first pattern 410 and within all of second pattern 416, finishing process can be conducted as needed. For example, machining can be conducted as described above with respect to FIG. 1A-1C in order to form a finished hole through substrate 400 according to desired specifications (i.e., to blueprint specifications). As shown in FIG. 4C, finished hole 432 substantially matches desired hole location 402.

In situations where only discrete damage to a substrate is present near a hole, an insert (i.e. a weld backing) can be used during welding in order to reduce and preferably eliminate the need for post-weld finishing, such as post-weld machining. When conducting a repair procedure using an insert according to the present invention, the damage is first identified and material of the substrate is then removed around the location of the damage, as described above. Then, generally prior to welding the filler to the substrate, an insert is positioned within the hole.

Figure 5A:
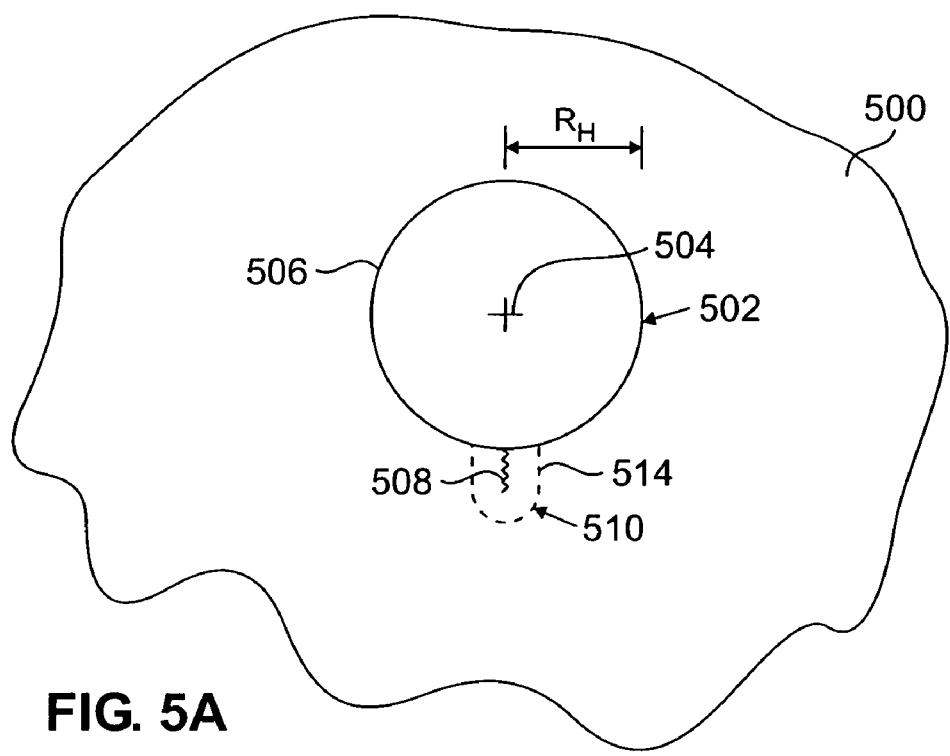
FIG. 5A is a schematic representation of a parabolic repair pattern for a hole in a substrate with a crack.

FIG. 5A is a schematic representation of substrate 500 having hole 502 defined therethrough. Hole 502 is defined by hole centerline axis 504 and hole perimeter 506 at radius $R_H$ about axis 504. Crack 508 extends from hole perimeter 506. U-shaped or parabolic repair pattern 510, which is defined by pattern perimeter 514, is located at hole perimeter 506.

Figure 5B:
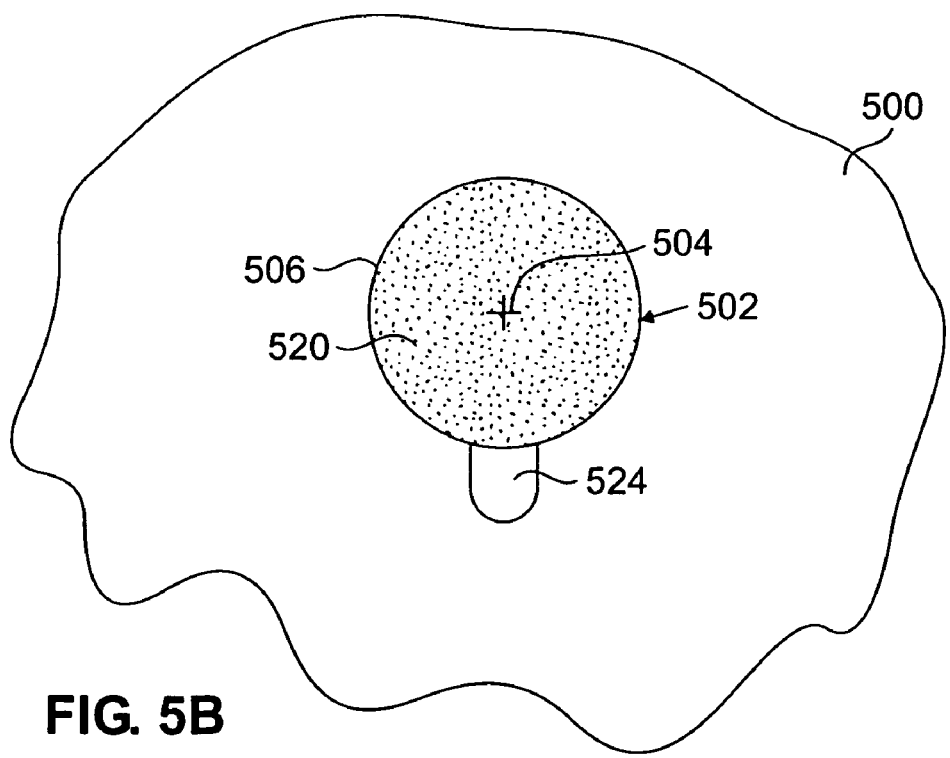
FIG. 5B is a schematic representation of the substrate of FIG. 5A after a filler material has been welded to the substrate, and with a substantially solid insert positioned within the hole.

FIG. 5B is a schematic representation of substrate 500 after substrate material has been removed within pattern 510. Substantially solid insert 520 is positioned within hole 502. Insert 520 is formed to the desired dimensions of desired hole shape. Insert 520 can be constructed of any suitable material, such as, for example, a common casting core, a refractory metal or a quartz weld backing, etc. Insert 520 can be provided in the form of a pre-shaped solid material, or provided as a formable paste made of a powder and a suitable binder. Insert 520 should have a melting temperature greater than substrate 500 and weld material 524.

Weld material 524 is welded where material was removed from pattern 510. Weld material 524 abuts substrate 500 and insert 520. Insert 520 acts like a casting mold during the welding process in order to form weld material 524 in a desired shape as weld material 524 becomes flowable during welding. This more closely provides desired hole specifications during the welding process, while reducing and preferably eliminating the need for post-weld finishing (e.g., machining of the weld material to desired hole specifications).

Figure 6:
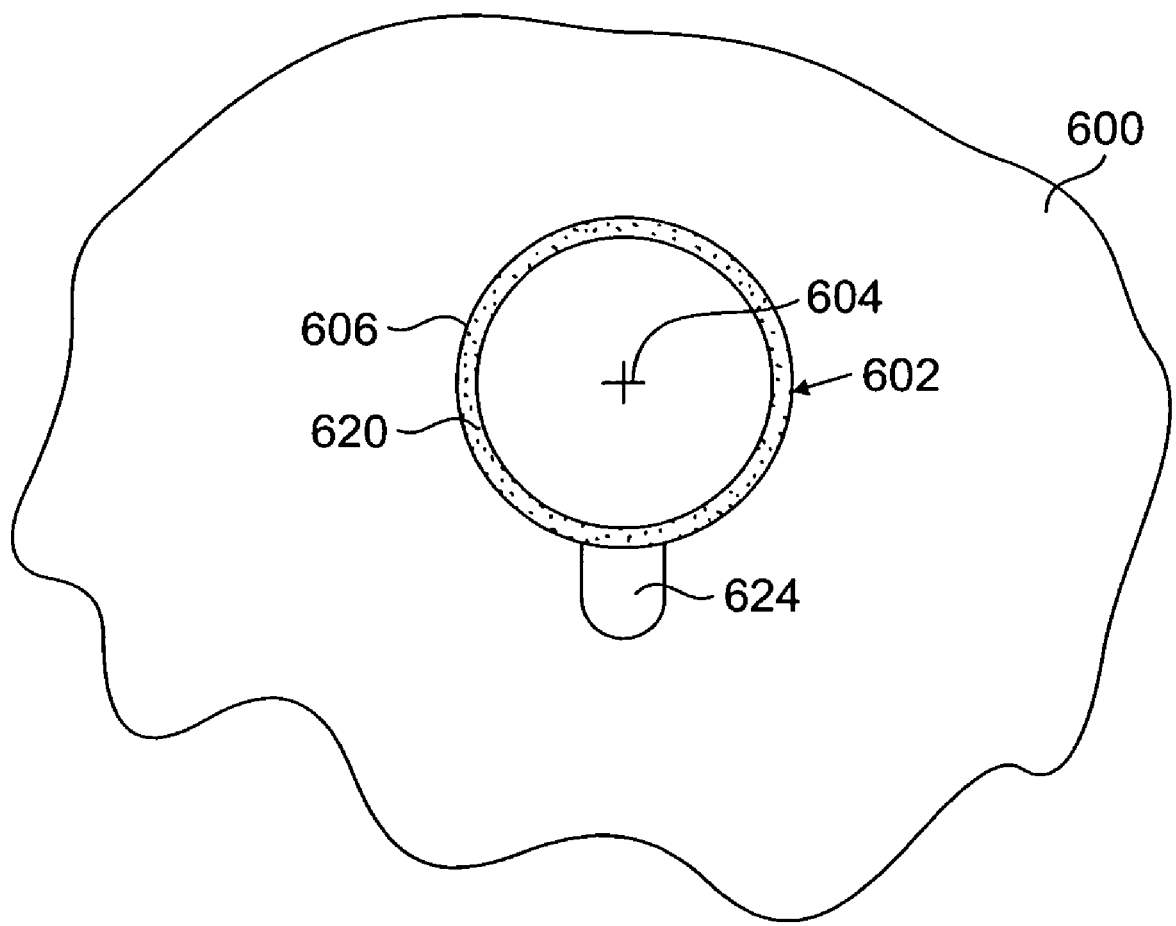
FIG. 6 is a schematic representation of a filler material welded to a substrate with a hole in a parabolic repair pattern, and a hollow insert positioned within the hole.

In a further embodiment, the insert can be hollow. FIG. 6 is a schematic representation of hollow insert 620 positioned within hole 602 (defined by hole centerline axis 604 and hole perimeter 606) in substrate 600, with weld material 624 in a U-shaped or parabolic shaped opening defined adjacent to hole 602. Hollow insert 620 is generally similar to substantially solid insert 520 shown and described with respect to FIG. 5B.

Although the present invention has been described with reference to several alternative embodiments, workers skilled in the art will recognize that changes may be made in form and detail without departing from the spirit and scope of the invention. For instance, many different repair pattern shapes and arrangements can be utilized.

The invention claimed is:

1. A method of hole defect repair, the method comprising:
creating a substantially circular first opening in the substrate that is larger in diameter than 1 desired hole shape of existing through hole, wherein centerline axes of the desired hole shape and the first opening are aligned;
creating a second opening in the substrate, wherein the second opening is positioned proximate a perimeter of the first opening, and wherein the first opening and the second opening are contiguous; and
welding a filler material within at least portions of the first and second openings subsequent to creating both the first and second openings to return the hole to specifications suitable for supporting a fastener therein, wherein the filler material is welded within at least a portion of the first opening using a conductive heat resistance welding technique, and further, the filler material is welded within at least a portion of the second opening using an arc welding technique.

2. The method of claim 1, wherein the first opening is created before the second opening.

3. The method of claim 1, wherein the second opening is substantially circular and has a centerline axis, and wherein the centerline axis of the second opening is spaced from the centerline axis of the first opening.

4. The method of claim 1, and further comprising removing a portion of the filler material until the desired hole shape has been obtained.

5. A method of hole defect repair, the method comprising:
identifying a discrete defect in a substrate, the defect located contiguous with a substantially circular hole in the substrate, wherein the hole has a hole centerline axis;
removing material of the substrate within a region defined by a first circular pattern having a first pattern centerline axis in order to remove substantially entirely the discrete defect, wherein the first pattern centerline axis is spaced from the hole centerline axis and the first circular pattern adjoins the hole;
removing material of the substrate within a region defined by a second circular pattern having a second centerline axis that is co-axial with the hole centerline axis; and
welding a filler using a conductive heat resistance welding technique into at least a portion of the region defined by the first circular pattern and welding the filler using an arc welding technique into at least a portion of the region defined by the second circular pattern to return the hole to specifications suitable for supporting a fastener therein.

6. The method of claim 5, and further comprising:
creating a repaired hole in the substrate by machining the filler away to define the repaired hole in a desired shape.

7. The method of claim 5, and further comprising:
identifying circumferential damage to the substrate at a circumference of the substantially circular hole in the substrate.

8. The method of claim 5, wherein material of the substrate is removed within the region defined by the second circular pattern before material of the substrate is removed within the region defined by the first circular pattern.

9. The method of claim 5, wherein multiple welding techniques are utilized to weld the filler to the substrate.

10. The method of claim 5, and further comprising:
prior to welding the filler, positioning an insert within the hole in the substrate, wherein the insert substantially defines a desired hole shape for welding the filler at a perimeter portion of the desired hole shape; and
at least partially removing the insert after the filler has been welded to the substrate.

11. The method of claim 10, wherein the insert is hollow.

* * * * *

UNITED STATES PATENT AND TRADEMARK OFFICE
CERTIFICATE OF CORRECTION

| | | |
|---|---|---|
| PATENT NO. | : 7,552,855 B2 | Page 1 of 1 |
| APPLICATION NO. | : 11/249668 | |
| DATED | : June 30, 2009 | |
| INVENTOR(S) | : Chris Vargas et al. | |

It is certified that error appears in the above-identified patent and that said Letters Patent is hereby corrected as shown below:

In the Claims

Column 5, Line 33 delete "1", insert -- a --

Column 5, Line 34 delete "of existing", insert -- of an existing n--

Signed and Sealed this

Third Day of August, 2010

David J. Kappos
*Director of the United States Patent and Trademark Office*